US012791772B1

(12) United States Patent
Fang et al.

(10) Patent No.: US 12,791,772 B1
(45) Date of Patent: Nov. 10, 2026

(54) PHASE RETARDANCE HIGH REFLECTANCE COATING DESIGN

(71) Applicant: Apple Inc., Cupertino, CA (US)

(72) Inventors: Ming Fang, San Jose, CA (US); Ligang Wang, San Jose, CA (US); Yuhong Yao, Tracy, CA (US)

(73) Assignee: Apple Inc., Cupertino, CA (US)

( * ) Notice: Subject to any disclaimer, the term of this patent is extended or adjusted under 35 U.S.C. 154(b) by 509 days.

(21) Appl. No.: 18/470,337

(22) Filed: Sep. 19, 2023

Related U.S. Application Data

(60) Provisional application No. 63/376,967, filed on Sep. 23, 2022.

(51) Int. Cl.
*G02B 5/04* (2006.01)
*G02B 1/10* (2015.01)

(52) U.S. Cl.
CPC .................................... *G02B 5/04* (2013.01); *G02B 1/10* (2013.01)

(58) Field of Classification Search
CPC ............... G02B 5/04; G02B 1/10; G02B 1/08
See application file for complete search history.

(56) References Cited

U.S. PATENT DOCUMENTS 3,648,055 A * 3/1972 De Lang .................. G01D 5/38 356/396
5,973,835 A * 10/1999 Tsou .................... G02B 27/283 359/489.09
6,005,835 A * 12/1999 Tsuji .................. G02B 27/4238 369/103
7,196,835 B2 3/2007 Peumans et al.
8,660,432 B2 2/2014 Kuo et al.
8,842,365 B2 * 9/2014 Koike .................... G02B 1/115 359/587
2003/0026001 A1 * 2/2003 Heller .................. G02B 27/147 359/629
2004/0051947 A1 * 3/2004 Kagawa ............... G02B 5/3041 359/489.11

(Continued)

FOREIGN PATENT DOCUMENTS

GB 2319353 5/1998

OTHER PUBLICATIONS

Examiner provided machine translation of Wang et al., CN 1540370 A (Year: 2003).*

*Primary Examiner* — Balram T Parbadia
(74) *Attorney, Agent, or Firm* — Robert C. Kowert; Kowert, Hood, Munyon, Rankin & Goetzel, P.C.

(57) ABSTRACT

Various embodiments of coatings applied to a parallelepiped optical prism are disclosed. Light propagating inside such prisms has angles of incidence (AOI) on two surfaces that are less than 45°. The low (AOI) angles of these surface does not provide for total internal reflection. A coating may be added to increase reflectance. The present disclosure discusses a coating that has at least some random thickness distribution between alternating layers of different refractive index materials. The coating provides sufficient reflectance of light within the prism while reducing phase retardance and group delay for the light passing through the prism. Reducing in the phase retardance and the group delay reduces degradation of the modular transfer function (MTF) for light passing through the prism. The disclosed prisms and coatings may be utilized in combination with telephoto lenses to provide high quality zoom images.

20 Claims, 10 Drawing Sheets

(56) References Cited

U.S. PATENT DOCUMENTS

| | | | | |
|---|---|---|---|---|
| 2005/0226125 | A1* | 10/2005 | Taguchi | G02B 1/115 |
| 2006/0007302 | A1* | 1/2006 | Numata | G02F 1/133524<br>348/71 |
| 2016/0363851 | A1* | 12/2016 | Takahara | G02B 5/04 |
| 2019/0250421 | A1* | 8/2019 | Ogden | G02B 27/283 |
| 2022/0124263 | A1* | 4/2022 | Richarte | G01J 3/0208 |

* cited by examiner

PHASE RETARDANCE HIGH REFLECTANCE COATING DESIGN

BACKGROUND

This application claims benefit of priority to U.S. Provisional Application Ser. No. 63/376,967, entitled "Phase Retardance High Reflectance Coating Design," filed Sep. 23, 2022, and which is hereby incorporated herein by reference in its entirety.

TECHNICAL FIELD

Embodiments described herein relate to coatings for optical components. More particularly, embodiments described herein relate to high reflectance coatings with controlled phase retardance for optical prisms.

DESCRIPTION OF THE RELATED ART

Optical prisms are used in a wide variety of camera systems. Prisms are typically used to redirect light paths within camera systems. For example, prisms may be used to bend light (e.g., change the direction of the light path) or to spatially displace the light path (e.g., shift the location of the light path along the same direction). Prisms are often advantageous to use in small, mobile multipurpose devices such as smartphones and tablet or pad devices. These devices increasingly have a need for high-resolution, small form factor cameras for integration in the devices. The utilization of prisms may help to create smaller form factors. The addition of prisms to these devices, however, creates challenges to ensure the structures maintain high quality imaging while also reducing the form factor of the device.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
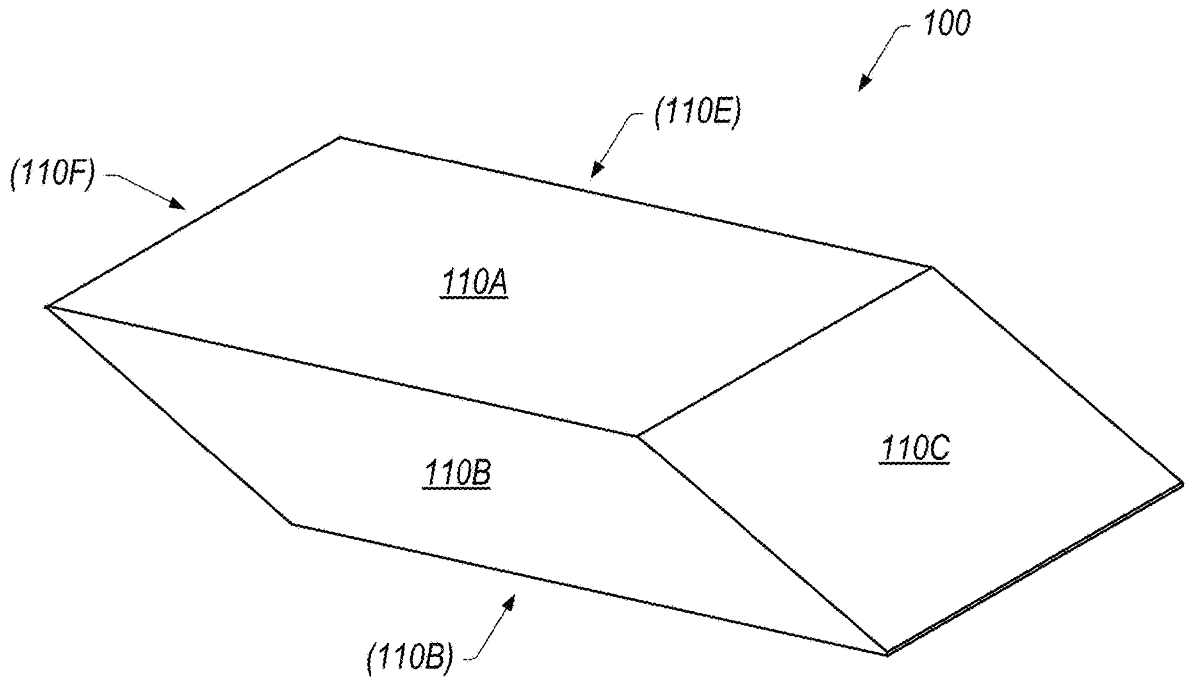
FIG. 1 depicts a perspective representation of a parallelepiped prism, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section **112(*f*)** during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Optical prisms, as described above, can be implemented in camera systems to bend or shift a path of light. The bending or shifting of light is typically achieved through reflection off one or more surfaces, either inside or outside, of the prism. Various embodiments of prisms are oblique prisms. Oblique prisms may provide the capability to shift the path of light in one plane (e.g., shift in a horizontal plane) while maintaining the path in another plane (e.g., maintaining path in a vertical plane). One particular type of oblique prism is a parallelepiped prism. A parallelepiped prism is an oblique prism of which the base is a parallelogram. Thus, a parallelepiped prism has six faces that are all parallelograms and the prism has a parallelogram cross-sectional shape.

FIG. 1 depicts a perspective representation of a parallelepiped prism, according to some embodiments. In the illustrated embodiment, prism 100 is a prism having six parallelogram sides (surfaces). Three sides of prism—110A, 110B, 110C—are viewed in the depiction of FIG. 1 with remaining sides—110D, 110E, 110F—hidden from view. In certain embodiments, prism 100 includes adjacent sides that are at oblique angles to each other. Accordingly, the angles at the vertices between adjacent sides 110 are either acute or obtuse in prism 100. For instance, the angle between side 110A and side 110C is obtuse while the angle between side 110C and side 110B is acute.

Depending on the incident path of light into prism 100, the prism can bend or shift the light accordingly based on reflections within the prism. With the oblique angles present in prism 100, however, some surfaces of sides 110 may not provide total internal reflection depending on the incident angle of light on the surface. For instance, as is known in the art, total internal reflection at a glass/air interface (e.g., a surface at the glass/air interface) occurs at incident angles greater than about 42°. Thus, any surfaces with these incident angles do not need a coating placed on the surface to generate total internal reflection and high reflectivity of the incident light.

When used in camera systems or other optical systems where high light reflectivity is desired in the prism, prism surfaces that have incident angles below about 420 may need a surface coating (e.g., a mirror coating) to provide higher reflectivity of light off the surfaces. Otherwise the incident light will lose signal as it passes through the prism, resulting in degradation in quality of an image or other optical result associated with the light passing through the prism.

Figure 2:
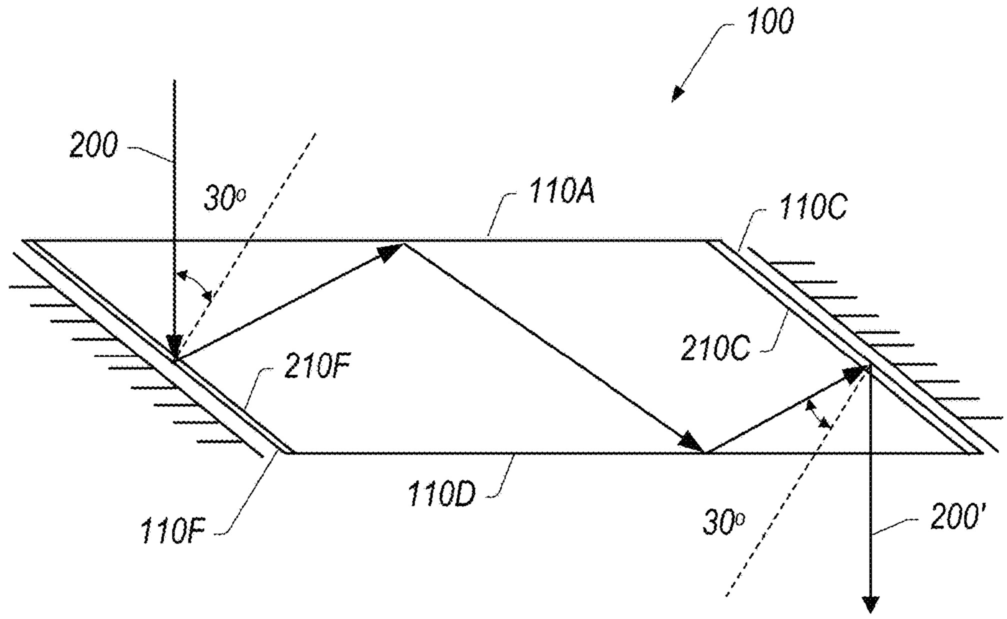
FIG. 2 depicts a cross-sectional representation of a prism with coated surfaces and a contemplated light path, according to some embodiments.

FIG. 2 depicts a cross-sectional representation of prism 100 with coated surfaces and a contemplated light path, according to some embodiments. In the illustrated embodiment, incident light 200 passes into prism 100 perpendicularly through side 110A of the prism. Light exits prism 100 as transmitted light 200'. In the contemplated embodiment, prism 100 is utilized to shift the path of light (e.g., spatially displace the path of light). For example, as shown in FIG. 2, the path of transmitted light 200' is horizontally shifted relative to the path of incident light 200 (e.g., the location where transmitted light 200' exits prism 100 is horizontally shifted from the location where incident light 200 enters the prism). The vertical component of the paths for both incident light 200 and transmitted light 200', however, remains the same (e.g., incident light 200 enters the prism perpendicular to sides 110A and 110D and transmitted light 200' exits the prism perpendicular to sides 110A and 110D).

With prism 100 positioned to receive incident light path 200, the angle of incidence on side 110F is about 30°, as shown in FIG. 2. With this angle of incidence being below the angle of incidence needed for total internal reflection (e.g., about 42°), in certain embodiments, coating 210F is placed on the interior surface of side 110F. Similarly, opposite side 110C (opposite of side 110F) also has incident light with an angle of incidence of about 30°. Thus, coating 210C may be placed on the interior surface of side 110C. Sides 110A and 110D, however, have incident light with angles of incidence greater than the angle needed for total internal reflection (e.g., greater than 42°) and thus these sides do not need a surface coating for reflection.

The present disclosure contemplates various coatings (e.g., coating 210) that may be implemented in a prism with oblique angles (e.g., prism 100) to provide internal reflections on surfaces with angles of incidence that do not provide total internal reflections. It should be noted that the angles of incidence depicted in FIG. 2 are "primary" or "average" angles of incidence for light within prism 100 and that the actual incident light may have a range of angles of incidence on a surface since not all light enters the prism completely perpendicularly. The angle of incidence (AOI) range may be determined by the focus of light entering the prism. For instance, when light is directed to a prism (e.g., light is focused towards the prism), the AOI range is dependent on the size of the aperture directing the light to the prism since the larger the aperture, the wider range of directions light can come from. Thus, when a lens (e.g., a camera lens) has a lower f-number (e.g., a wider aperture), the AOI range in the prism may be higher.

Figure 3:
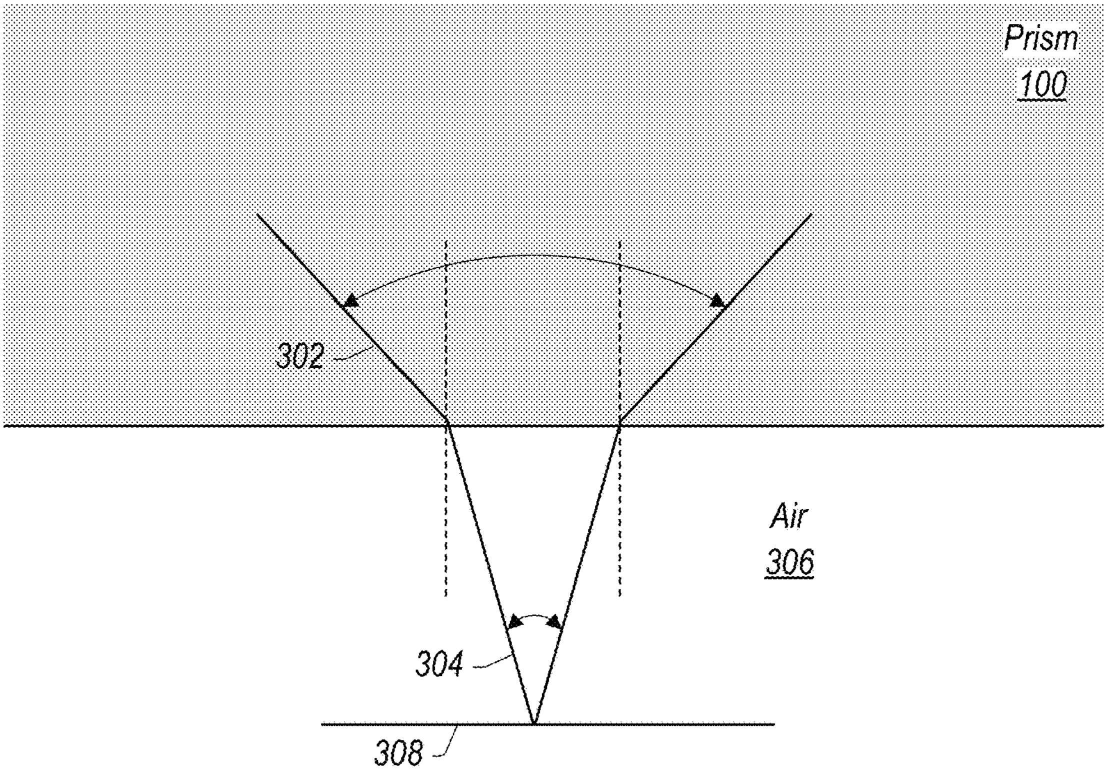
FIG. 3 depicts a representation of AOI ranges inside and outside a prism, according to some embodiments.

Additionally, many prisms may increase the AOI range within the prism due to the material used as the substrate of the prism. For instance, dielectric material will increase the AOI range within the substrate. FIG. 3 depicts a representation of AOI ranges inside and outside a prism, according to some embodiments. As shown in FIG. 3, AOI range 302 is higher in prism 100 than AOI range 304 in air 306 with light incident on sensor 308. The increased AOI range (e.g., AOI range 302) in prism 100 may increase the challenge in developing coatings that provide sufficient reflectivity on surfaces with angles of incidence that do not provide total internal reflections.

Figure 4:
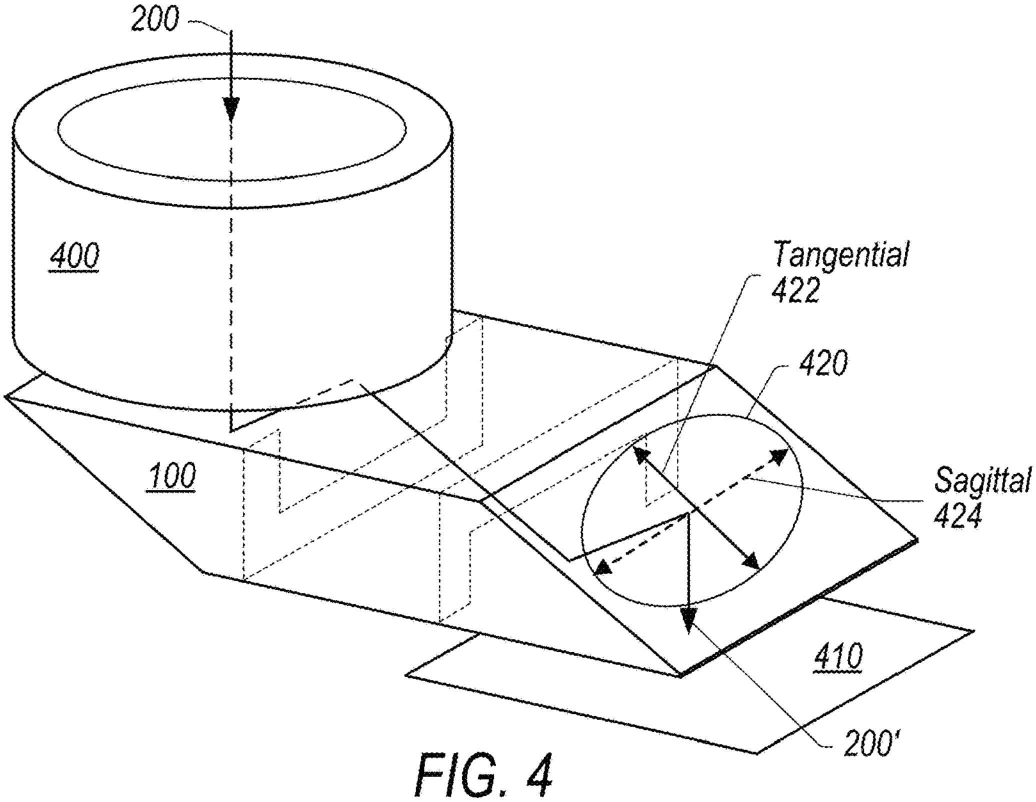
FIG. 4 depicts an example representation of tangential and sagittal planes for a prism and lens system, according to some embodiments.

Another challenge in developing coatings for surfaces with angles of incidence that do not provide total internal reflections is the differences in AOI range behavior of the tangential and sagittal planes of light propagating through the prism. As used herein, the "tangential plane" (also called the meridional plane) refers to the plane that contains the chief ray and the optical axis of the lens (or lens system) while the "sagittal plane" (also called the radial and/or equatorial plane) refers to the plane that contains only the chief ray and is positioned perpendicular to the tangential plane. FIG. 4 depicts an example representation of tangential and sagittal planes for a prism and lens system, according to some embodiments. In the illustrated embodiment, prism 100 is positioned to receive incident light 200 from lens assembly 400 and transmit the light to image sensor 410. Circle 420 represents indicates the relative planes—the tangential plane 422 and the sagittal plane 424 of light passing through prism 100.

Figure 5:
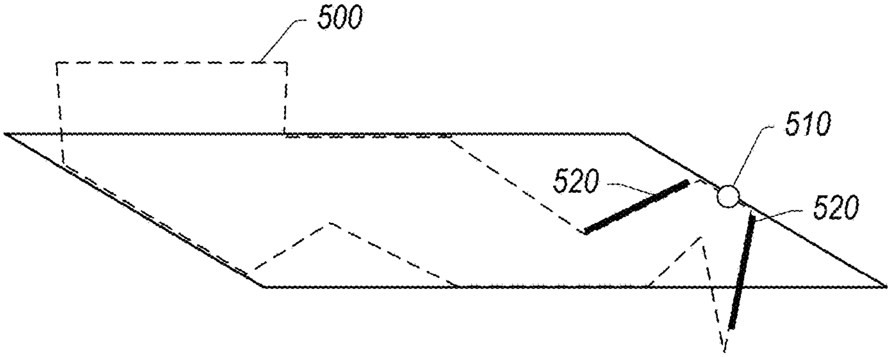
FIG. 5 depicts a representation of AOI ranges for the tangential and sagittal planes in a prism, according to some embodiments.

FIG. 5 depicts a representation of AOI ranges for the tangential and sagittal planes in prism 100, according to some embodiments. In the illustrated embodiment, region 500 (dashed lines) is a region for light passing through prism 100. Circle 510 represents the AOI range for light along the sagittal plane while the area between lines 520 represents the AOI range light along the tangential plane. As shown in FIG. 5, the range for AOI in the tangential plane is higher than the range for AOI in the sagittal plane. For instance, in an embodiment of prism 100 with 300 angles (as depicted), the AOI range in the tangential plane is between about 23° and about 37° while the AOI range in the sagittal plane is between about 30° and about 30.7°.

Because of the large spread in AOI in the tangential plane, phase retardance is more pronounced in the tangential plane causing images to have less sharpness and more degradation in the tangential plane. As used herein, "phase retardance" is the difference in optical phase shifts between two polarization directions for light transmitted through a sample or reflected at a surface, such as in prism 100. Dielectric mirrors, such as prism 100, have resonant wavelengths for group delay of light passing through the mirror. Phase accumulation may occur rapidly around these resonant wavelengths while the resonant wavelengths are dependent on polarization of light and AOL. Differences in resonant wavelengths and thus group delay between S and P polarizations may result in large phase retardance. Thus, because dielectric mirrors have strong resonant wavelengths, phase retardance can be an issue in dielectric mirrors.

Figure 6:
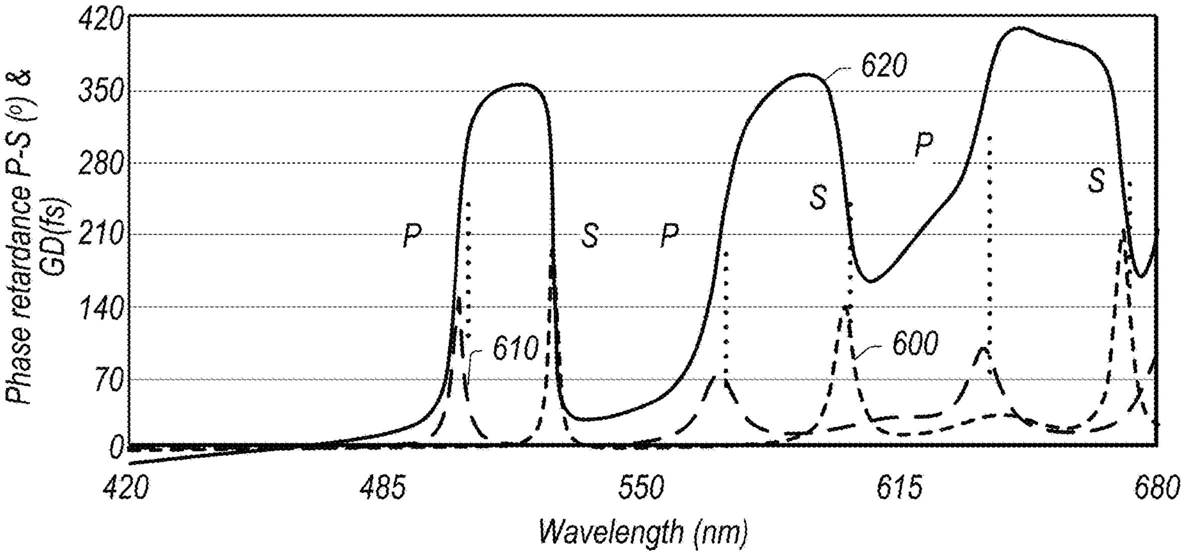
FIG. 6 depicts an example plot of group delay and phase retardance versus wavelength for a dielectric mirror.

FIG. 6 depicts an example plot of group delay and phase retardance versus wavelength for a dielectric mirror (such as prism 100). Group delay (GD) for S polarization is shown by dashed line 600, GD for P polarization is shown by dashed line 610, and phase retardance is shown by the solid line 620. As shown by the plot in FIG. 6, phase retardance has a dramatic change in magnitude whenever a group delay from S or P polarization occurs. Additionally, group delay increases with increasing wavelength, thus creating increased effects on phase retardance.

Figure 7:
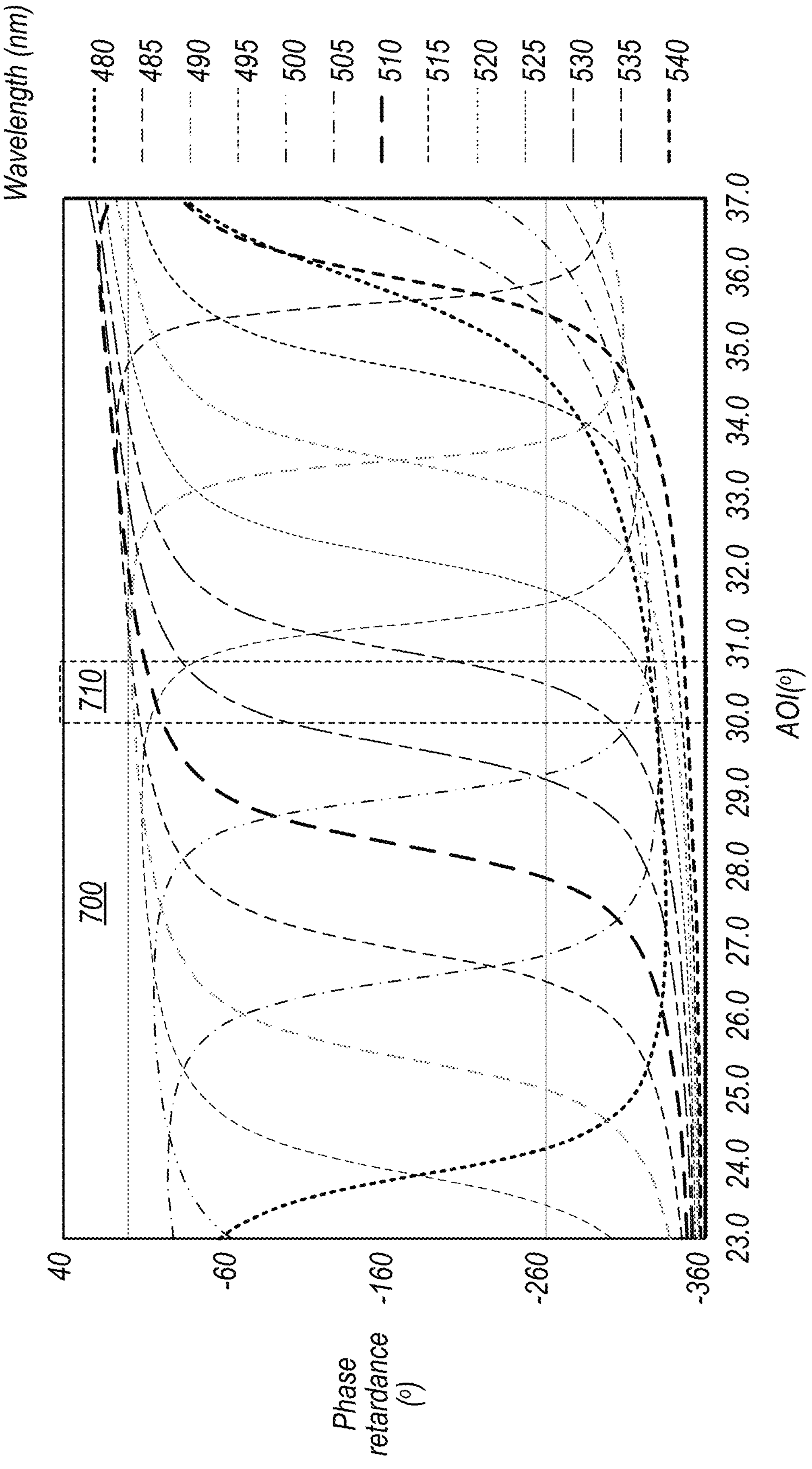
FIG. 7 depicts an example plot of phase retardance versus AOI over various wavelengths for a prism, according to some embodiments.

In addition to the effects of wavelength on phase retardance, phase retardance is affected by the AOI range. FIG. 7 depicts an example plot of phase retardance versus AOI over various wavelengths for prism 100, according to some embodiments. In the plot, the y-axis is phase retardance and the x-axis is AOL. AOI is shown over the entire AOI range 700 of 23° to 37° for the tangential plane of prism 100, shown in FIG. 5. AOI range 710 is the AOI range (e.g., 30° to 30.7°) for the sagittal plane. Various wavelengths of light are shown in the plot of FIG. 7. As shown by the plot, there are large changes in phase retardance from angle to angle and from wavelength to wavelength. Thus, the large AOI range of the tangential plane creates more issues with phase retardance than the smaller AOI range of the sagittal plane.

Figure 8:
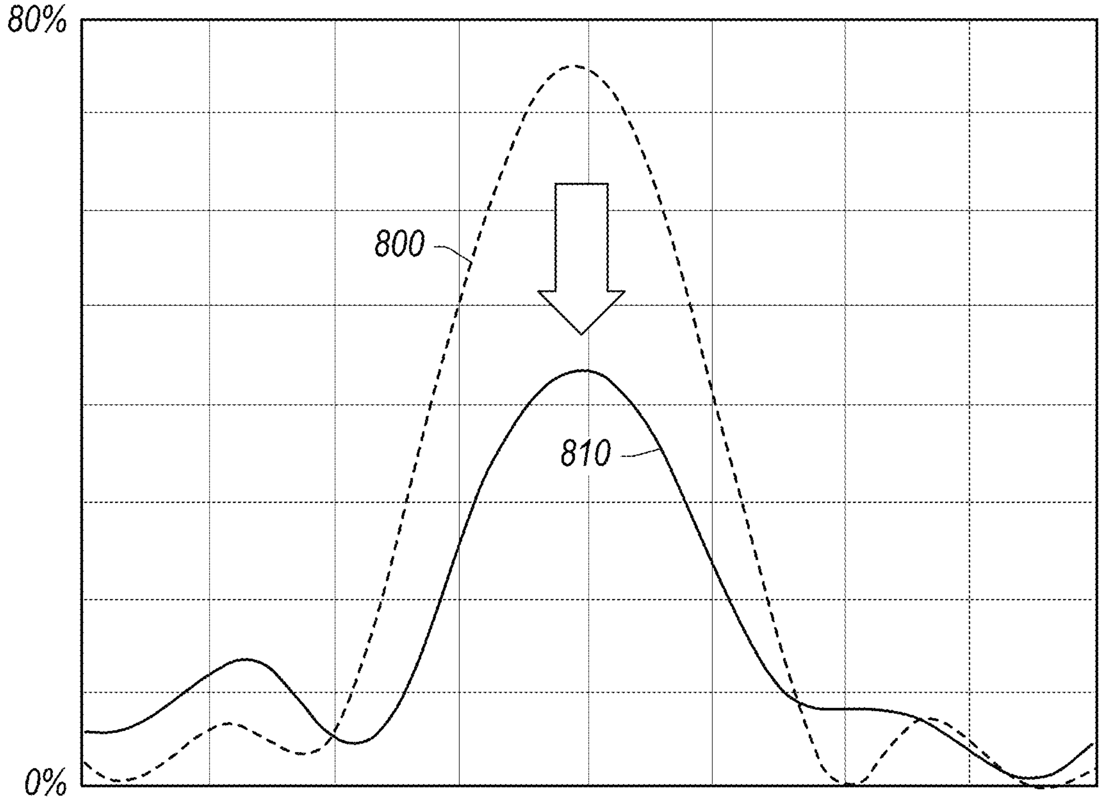
FIG. 8 depicts an example plot of modular transfer function (MTF) for images captured using a prism, according to some embodiments.

The large phase retardance may cause degradation in quality (e.g., sharpness) of images captured using light propagating through prism 100 (e.g., image sensor 410, shown in FIG. 4). FIG. 8 depicts an example plot of modular transfer function (MTF) for images captured using prism 100, according to some embodiments. MTF is a measure of image sharpness generally used for camera systems. The higher the degradation (e.g., drop) in MTF, the less clear images will appear. In the illustrated embodiment, plot 800 is the MTF for the sagittal plane while plot 810 is the MTF for the tangential plane. As shown by plots 800, 810, the increased AOI range for the tangential plane (and thus increased phase retardance) causes a noticeable drop in MTF (e.g., a drop greater than 30%).

Figure 9:
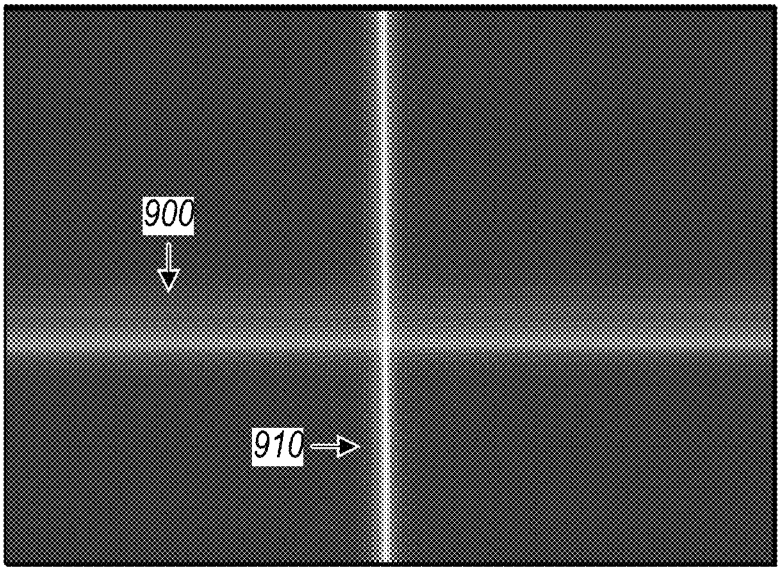
FIG. 9 is an example image showing differences in sharpness between a line in the tangential plane and a line in the sagittal plane.

FIG. 9 is an example image showing differences in sharpness between line 900 in the tangential plane and line 910 in the sagittal plane. As shown in the example image, line 900 (the horizontal line) is blurred while line 910 (the vertical line) is sharp. This difference in blurriness in one direction (e.g., the tangential plane) and sharpness in another direction (e.g., the sagittal plane) reduces the quality of the image.

The present disclosure contemplates a coating design for prism 100 that reduces the phase retardance and improves image quality over current high reflectance coatings. Coatings used for prisms (e.g., dielectric mirrors) typically have alternating layers of refractive materials with different indices of refraction. For example, a coating may have alternating layers of titanium dioxide and silicon dioxide. This coating may be added to the interior surfaces of the prism or dielectric mirror to increase reflections on surfaces that do not have total internal reflection.

Figure 10:
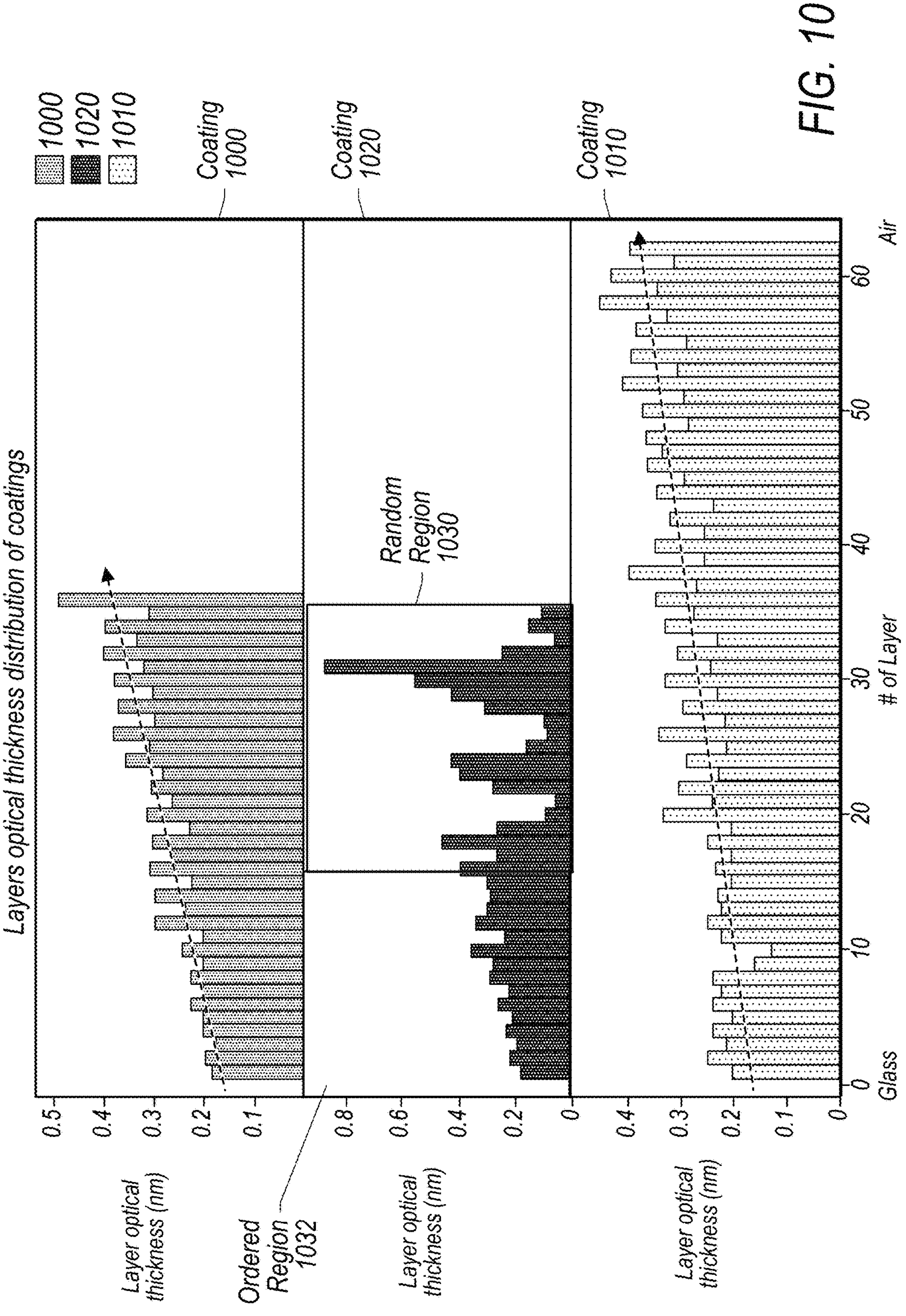
FIG. 10 depicts a plot of layer optical thickness versus layer number for three different coatings, according to various embodiments.

FIG. 10 depicts a plot of layer optical thickness versus layer number for three different coatings, according to various embodiments. Three different coatings are shown in the panels of FIG. 10—coating 1000 (upper panel), coating 1010 (lower panel), and coating 1020 (middle panel). Each of coatings 1000, 1010, 1020 includes alternating layers of two materials with different indices of refraction. In the illustrated embodiment, the coatings include alternating layers of titanium dioxide ($TiO_2$) and silicon dioxide ($SiO_2$). The coatings, however, may include any combination of metal oxides or other materials that have distinct indices of refraction in order to provide reflection of light incident on the coating.

As shown in FIG. 10, coating 1000 and coating 1010 are examples of current types of high reflectance coatings. As shown by the plot of thickness versus layer number for coating 1000 and coating 1010, current high reflectance coatings have an ordered thickness pattern of alternating layers of refractive materials having different indices of refraction. The ordered thickness pattern of alternating layers of refractive materials (e.g., ordered/controlled thickness of pairs of refractive materials) provides high reflectivity in the coatings. For instance, reflectivity above 99% may be achieved due to the ordered thickness patterns in coating 1000 and coating 1010.

In various embodiments, coating 1000 and coating 1010 generally have gradual increases in layer optical thickness (shown by the arrows in FIG. 10) from a glass side of the coating to an air side of the coating. Layer optical thicknesses may be increased from the side of light incidence (e.g., glass side) to the side of light transmittal (e.g., air side) to attempt to minimize phase retardance for a coating design. This gradual increase in layer optical thickness does, however, generally increase the group delay as wavelength increases. Because of the increase in group delay, the ordered thickness patterns of coating 1000 and coating 1010 maintains the group delay and phase retardance values at undesirably high levels that may reduce image quality. For example, coating 1000 has a group delay above 45 femtoseconds (fs) and a phase retardance above 250° while coating 1010 has a group delay above 125 fs and a phase retardance above 400°. These values are high enough to still cause image quality issues. The image quality issues associated with the group delay and corresponding phase retardance values for coatings 1000 and 1010 is further exemplified in the simulation examples of FIGS. 11-17 described below.

Coating 1020 is a coating contemplated according to the present disclosure to reduce group delay and phase retardance by randomizing the thickness pattern for alternating layers of refractive material in at least a portion of the coating. For example, pairs of titanium dioxide and silicon dioxide layers may have a random thickness distribution in a portion of coating 1020. In the illustrated embodiment, region 1030 is the portion of coating 1020 that has random thickness distribution in pairs of titanium dioxide and silicon dioxide layers. Region 1030 may be, for example, a subset (e.g., portion) of the total layers in coating 1020. In certain embodiments, region 1030 is the portion of coating 1020 on the air side of the coating (e.g., the transmittance side of the coating). Placing region 1030 on the air side of the coating may help to reduce group delay and phase retardance in the high wavelength region of coating 1010, thereby providing better overall reduction of group delay and phase retardance due to accumulation of group delay. Additional embodiments may, however, be contemplated where region 1030 is the portion of coating 1020 on the glass side of the coating. In other embodiments, region 1030 may be placed in any part of coating 1020 (e.g., not directly on the glass side or the air side of the coating). Region 1030 is typically only a portion of coating 1020 as randomization of the entire thickness of coating 1020 may cause reduction in reflectivity to unacceptable levels. Accordingly, in certain embodiments, coating 1020 includes "random pattern" region 1030 and "ordered pattern" region 1032.

The inclusion of region 1030 in coating 1020 advantageously reduces the group delay and corresponding phase retardance in the coating as compared to coatings 1000 and 1010. For example, in one embodiment, the group delay of coating 1020 is below 15 fs and the phase retardance is below 115°. These group delay and phase retardance values for coating 1020 are well below the values for coatings 1000 and 1010 (described above). With the reduced group delay and phase retardance, coating 1020 provides improved image quality (e.g., image sharpness) as exemplified in the simulation examples of FIGS. 11-17 described below. The reduction in group delay and phase retardance of coating 1020 is due to the presence of region 1030. For instance, the random thickness distribution in region 1030 breaks up the accumulation of group delay in coating 1020 that occurs in region 1032 with the ordered pattern of alternating layer pairs.

As described above, region 1030 is a portion of coating 1020 where the thickness of the layers vary randomly, thus the variation in thickness between layers in region 1030 is larger than the variation in thickness between layers in region 1032 (e.g., the ordered pattern portion of the coating). In certain embodiments, the variation in thickness between layers in region 1030 is in a range of thickness variation where the range of thickness variation for region 1030 is above a range of thickness variation for region 1032. For example, the variation in thickness between layers in region 1030 may be above a lower thickness variation threshold. The variation in thickness between layers in region 1032 may be below the lower thickness variation threshold for region 1030 as region 1032 has a more ordered pattern of layer thicknesses (e.g., less random pattern of layer thicknesses) than region 1030. Accordingly, the lower thickness variation threshold for region 1030 may be a threshold that defines the transition from an ordered pattern for thickness variations below the threshold and a random pattern for thickness variations above the threshold.

As the variation in thickness between layers in region 1032 is below the lower thickness variation threshold for region 1030, the range of thickness variation for region 1032 is also below the range of thickness variation for region 1030. Accordingly, portions (e.g., subsets of layers) in coating 1020 in the range of thickness variation for region 1032 are considered to have an ordered pattern of layer thicknesses while portions (e.g., subsets of layers) in the coating in the range of thickness variation for region 1030 are considered to have a random pattern of layer thicknesses.

In some embodiments, an upper thickness variation threshold for region 1030 may be implemented to define the range of thickness variation for region 1030. The upper thickness variation threshold may, for example, set an upper limit on the randomness for the random pattern of layer thicknesses in region 1030. The upper thickness variation threshold may accordingly be an upper limit on the range of thickness for region 1030. It should be noted, however, that there may not be a need for an upper limit on the range of thickness variation for region 1030 (or the corresponding upper thickness variation threshold) as embodiments may be contemplated where there is not any limit to the amount of randomness in layer thicknesses allowed for region 1030. Embodiments may also be contemplated where a lower thickness variation threshold is implemented for region 1032. Such a lower thickness variation threshold for region 1032 may place a limit on the amount of order in layer thicknesses in region 1032. Similar to the upper thickness variation threshold for region 1030, the lower thickness variation threshold for region 1032 may not be necessary for many contemplated embodiments.

The present disclosure contemplates various parameters to define the "randomness" (e.g., amount of random pattern) of coatings (such as coatings 1000, 1010, 1020) according to measurable properties. These parameters may then be utilized to define thresholds for thickness variation in random patterns of layer thicknesses that may implemented in coating 1020. A first parameter for coatings is the optical thickness. "Optical thickness (OTHK)" is a parameter defined for each layer in a coating (e.g., a layer of titanium dioxide or silicon dioxide) based on its physical thickness and its index of refraction at a specified wavelength. In certain embodiments, optical thickness (OTHK) of a layer is defined by the equation:

$$OTHK = \text{index}(\lambda) \times THK/\lambda; \quad \text{(Equation 1)}$$

where index(λ) is an index of refraction of the layer at the wavelength λ, and THK is a physical thickness of the layer.

"Optical thickness orderliness (ORR)" is a parameter that then may be defined for the coating based on the OTHK values for each layer in the coating. To determine ORR, first, a least squares linear fitting of OTHK may be determined according to the equation:

$$y = a \times OTHK + b. \quad \text{(Equation 2)}$$

From the least squares linear fitting, a fitting error sum of squares (SSE) may be determined, where n is a total number of alternating layers of refractive material in the coating, by the equation:

$$SSE = \sum_{i=1}^{n} (OTHK_i - y_1)^2. \quad \text{(Equation 3)}$$

Further, a total sum of squares (SST) may be determined by the equation:

$$SST = \sum_{i=1}^{n} \left(OTHK_i^2 - \left(\sum_{i=1}^{n} OTHK_i\right)^2/n\right). \quad \text{(Equation 4)}$$

ORR (the optical thickness orderliness) may then be defined by the equation:

$$ORR = 1 - (SSE/SST). \quad \text{(Equation 5)}$$

As shown by the above equations, ORR is a parameter that may be determined from values of the physical thicknesses of layers in the coating, the refractive index of the layers in the coating, the total number of layers in the coating, and a specified wavelength of light.

Another parameter that may be used to characterize coatings such as those disclosed herein is a parameter of orderliness*physical thickness (ORR*THK). ORR*THK may be defined, for example, by the equation:

$$ORR * THK = ORR \times \sum_{i=1}^{n} THK_i. \quad \text{(Equation 6)}$$

ORR*THK is a parameter to describe orderliness in combination with a total thickness of the coating. It should be noted, however, that the total thickness of a coating is generally determined to correlate to the wavelength of light (or range of wavelengths) intended for use with the coating. For instance, the total thickness of coating 1000 is different from the total thickness of coating 1010 as the coatings may have uses intended for different wavelengths of light. Thus, the total thickness of a coating may vary. The parameter ORR*THK may still, however, provide a parameter that can be used to provide a measurable comparison for orderliness and randomness of layer optical thicknesses between different coatings.

Based on the above-described parameters, comparisons can be made between coatings 1000, 1010, 1020, shown in FIG. 10. TABLE I provides values for the above-described parameters along with group delay and phase retardance. The parameters of ORR and ORR*THK have been determined at a wavelength of 532 nm.

TABLE I

| Coating | No. of Layers | ORR | Total Thickness (μm) | ORR * THK | Max Group Delay (fs) | Phase Retardance (°) |
|---|---|---|---|---|---|---|
| 1000 | 36 | 0.756 | 3.2 | 2.4192 | 45.1 | 277 |
| 1010 | 65 | 0.588 | 5.9 | 3.4692 | 129.4 | 428 |
| 1020 | 35 | 0.011 | 2.9 | 0.0319 | 13.9 | 112 |

As shown by the values in TABLE I, coating 1020 has lower the orderliness (as shown by ORR and ORR*THK) as well as lower group delay and phase retardance than coatings 1000 and 1010. Accordingly, the more randomness implemented in a coating (such as in coating 1020 as evidenced by the lower orderliness (ORR)), the better the properties of group delay and phase retardance become (e.g., group delay and phase retardance are reduced with less orderliness). With these lower values of group delay and phase retardance, coating 1020 provides better image quality as exemplified in the simulation examples of FIGS. 11-17 described below.

Coating 1020 may have some degradation in reflectivity compared to coatings 1000 and 1010. For instance, while coatings 1000 and 1010 have reflectivity values above 99% due to the ordered pattern of alternating layer thicknesses, coating 1020 may have a reflectivity value of around 95%. The lower reflectivity value may, however, still be suitable to provide sufficient signal transmission through a dielectric mirror (e.g., prism 100) to maintain image quality. In certain embodiments, reflectivity values of at least 90% may be sufficient to maintain image quality though higher or lower reflectivity values may be needed depending on other optical properties of a camera system (e.g., a sensitivity of an image sensor, transmittance of lenses, etc.). For example, in some embodiments, reflectivity values of at least 85% may be sufficient to maintain image quality.

Accordingly, various embodiments of coatings that provide reduced phase retardance with sufficient signal transmission are contemplated. These coatings may be implemented in optical prisms that have oblique angles (e.g., parallelepiped prisms). Various embodiments of these prisms have at least one surface inside the prism that has an angle of incidence of less than 40°. For example, prism 100, described herein, as two surfaces with an angle of incidence of about 30°. In general, the surfaces for coatings are surfaces that do not provide total internal reflection.

The coatings utilized in these prisms may be described according to the parameters of ORR and/or ORR*THK, described above. For example, in certain embodiments, a coating has an ORR value of at most 0.1. In some embodiments, a coating may have an ORR value of at most 0.05 or of at most 0.025. Additionally, in certain embodiments, a coating has an ORR*THK value of at most 1 though, in some embodiments, the coating may have an ORR*THK of at most 0.5 or at most 0.1.

Thickness variation thresholds, described above, may be determined based on these values of ORR. For instance, a lower thickness variation threshold for region 1030 may be determined based on having an ORR value of at most 0.1. For example, the lower thickness variation threshold may be a value where any less variation in the thicknesses between layers in region 1030 causes the ORR value to be above 0.1. An upper thickness variation threshold may also be determined based on not allowing the ORR value to go below a predetermined value (though such a threshold may not be necessary as embodiments may be contemplated where randomness in thicknesses is allowed to be as high as possible).

Coatings with these values of ORR and/or ORR*THK may provide decreased accumulation of group delay, thereby minimizing phase retardance in a prism having the coating. These coatings may also have reduced total thickness compared to some high reflectivity coatings, which may also decrease group delay accumulation and minimize phase retardance. The coatings with an ORR of at most 0.1 (and/or an ORR*THK value of at most 1) may also have less MTF degradation. For instance, in certain embodiments, a coating with an ORR of at most 0.1 has an MTF degradation of at most 5% in either the sagittal plane or the tangential plane. The coatings with an ORR of at most 0.1 also have reliable durability in high temperature and/or high humidity environments.

Example Simulations for Coatings 1000, 1010, 1020

Figure 11:
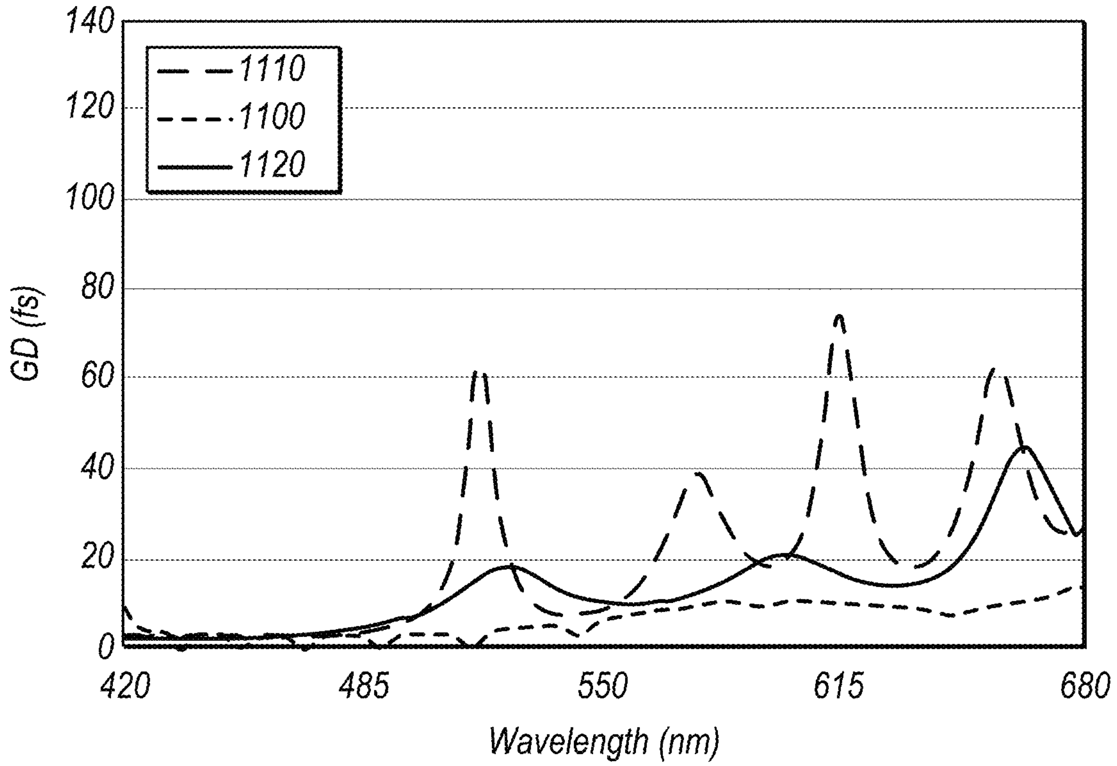
FIG. 11 depicts plots of simulations of P polarization group delay versus wavelength for coatings.
Figure 12:
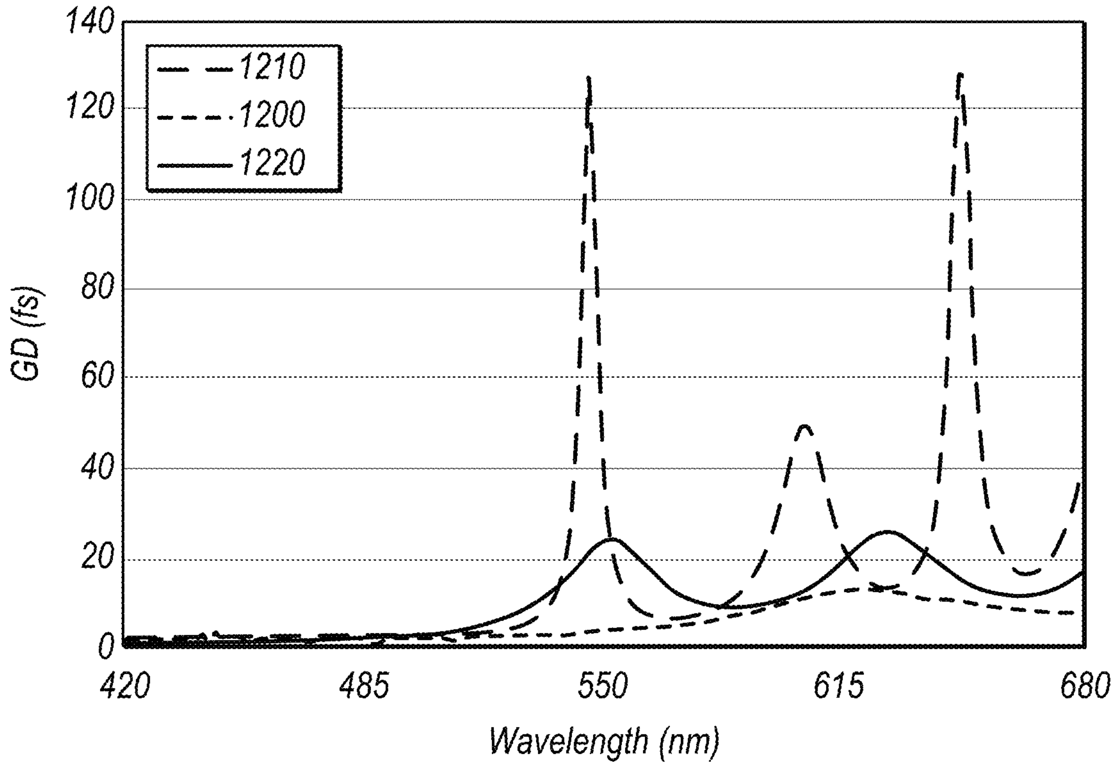
FIG. 12 depicts plots of simulations of S polarization group delay versus wavelength for coatings.

FIGS. 11-17 depict various simulations results for coatings 1000, 1010, 1020. FIG. 11 depicts plots of simulations of P polarization group delay versus wavelength for coatings 1000, 1010, 1020. Line 1100 is group delay for coating 1000, line 1110 is group delay for coating 1010, and line 1120 is group delay for coating 1020. FIG. 12 depicts plots of simulations of S polarization group delay versus wavelength for coatings 1000, 1010, 1020. Line 1200 is group delay for coating 1000, line 1210 is group delay for coating 1010, and line 1220 is group delay for coating 1020. As shown by the group delay plots in FIGS. 11 and 12, group delay is significantly less subject to wavelength changes and has lower absolute values for coating 1020 than either coating 1000 or coating 1010.

Figure 13:
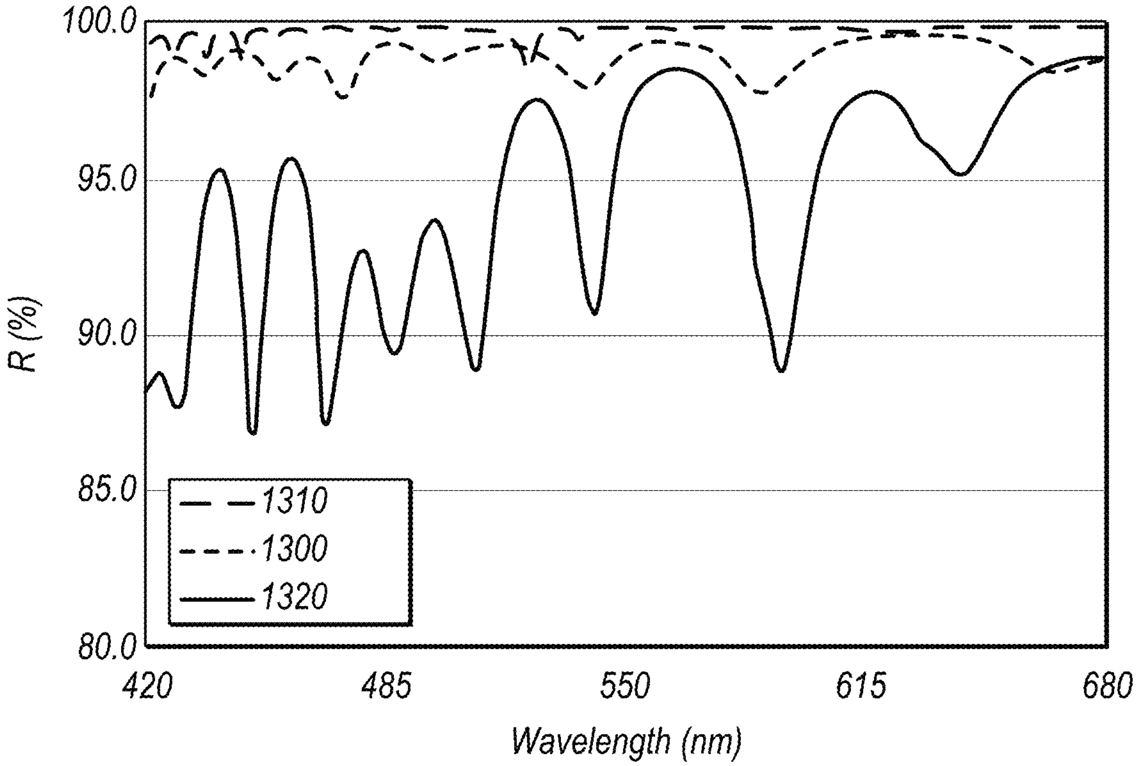
FIG. 13 depicts plots of reflectance versus wavelength for coatings.

FIG. 13 depicts plots of reflectance versus wavelength for coatings 1000, 1010, 1020. Line 1300 is reflectance for coating 1000, line 1310 is reflectance for coating 1010, and line 1320 is reflectance for coating 1020. As shown by the plots in FIG. 13, reflectance is lower for coating 1020 but is still maintained above 85%. For example, coating 1020 has an overall reflectivity value of about 95%, as described above.

Figure 14:
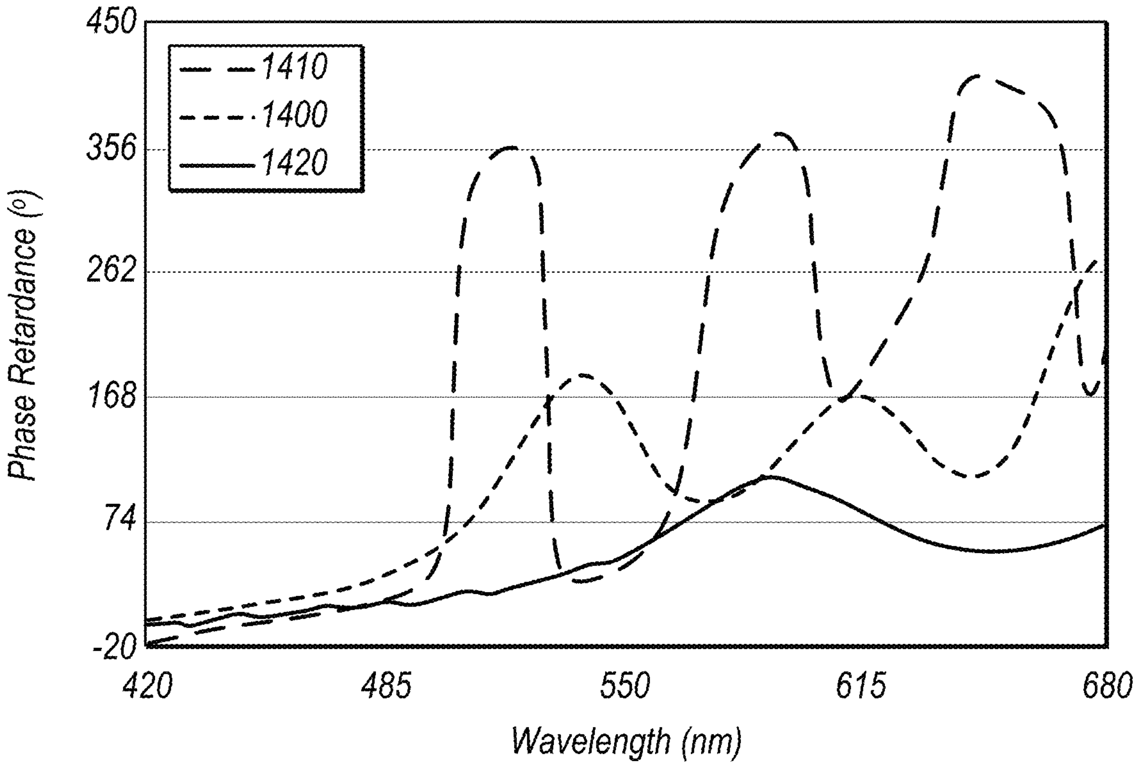
FIG. 14 depicts plots of phase retardance versus wavelength for coatings.

FIG. 14 depicts plots of phase retardance versus wavelength for coatings 1000, 1010, 1020. Line 1400 is phase retardance for coating 1000, line 1410 is phase retardance for coating 1010, and line 1420 is phase retardance for coating 1020. As shown by the plots in FIG. 14, phase retardance is less subject to wavelength and has a lower magnitude for coating 1020 than for either coating 1000 or coating 1010.

Figure 15:
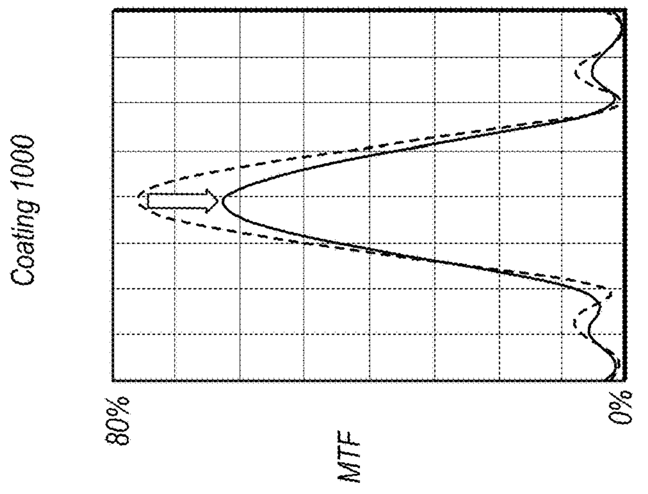
FIGS. 15-17 depict MTF degradation for various coatings.
Figure 16:
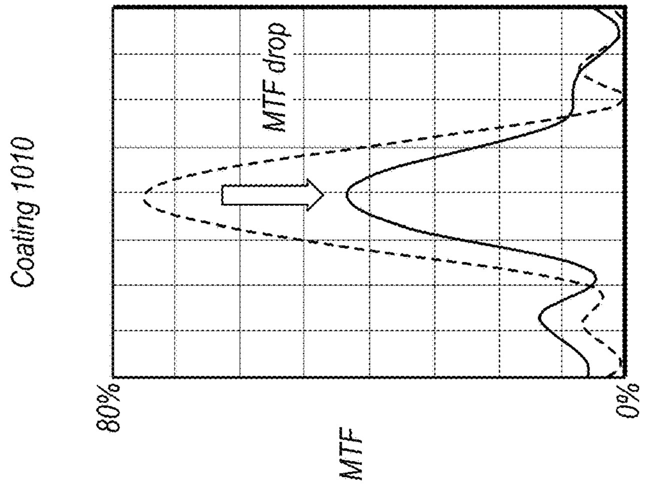
Figure 17:
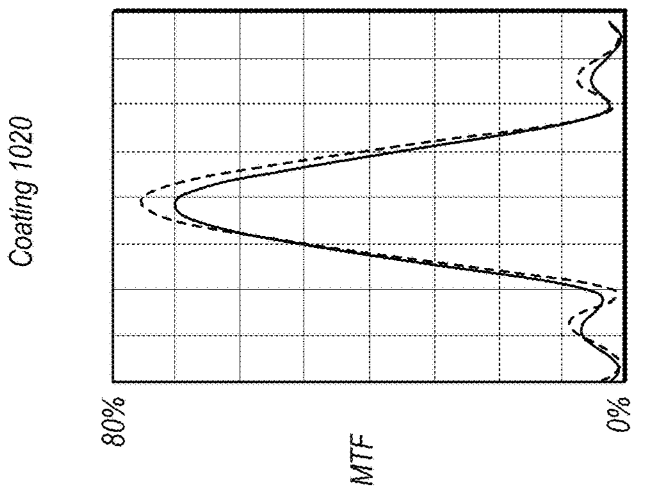

FIGS. 15-17 depict MTF degradation (drop) for each of coatings 1000, 1010, 1020. FIG. 15 depicts MTF degradation for coating 1000. FIG. 16 depicts MTF degradation for coating 1010. FIG. 17 depicts MTF degradation for coating 1020. As shown in the plots of FIGS. 15-17, coating 1020 has less drop in MTF than either coating 1000 or coating 1010. In various embodiments, as described above, coating 1020 has MTF degradation of less than 5%. This reduction in MTF degradation corresponds to increased image sharpness. Thus, when coating 1020 is utilized instead of either coating 1000 or coating 1010, any images captured will have higher image sharpness and thus, higher image quality.

Example System for Implementation of Coatings

Figure 18:
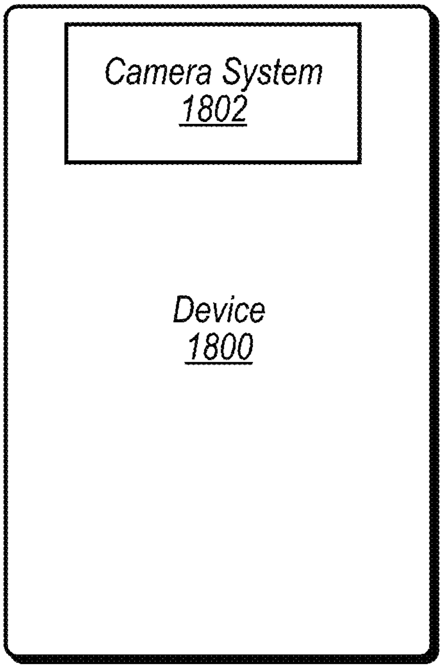
FIG. 18 depicts a representation of an embodiment of a mobile device.

Various optical systems may implement the disclosed embodiments of prisms with coatings having lower phase retardance (e.g., prism 100 with coating 1020 described above). Camera systems that have small form factors, such as those used in mobile devices, may utilize prism 100 with coating 1020 to improve the performance of the camera while maintaining the small form factor of the device. FIG. 18 depicts a representation of an embodiment of mobile device 1800. Device 1800 may be a small multipurpose computing device including any of various types of a computer system device that is mobile or portable and is capable of performing wireless communication. Examples of mobile devices include, but are not limited to, cell phones, smartphones, pad or tablet computing devices, laptop, netbook, notebook, subnotebook, and ultrabook computers. Various other types of devices may fall into this category if they include wireless or RF communication capabilities (e.g., Wi-Fi, cellular, and/or Bluetooth) and have a camera, such as portable gaming devices, portable Internet devices, and other handheld devices, as well as wearable devices. As described herein, the term "mobile device" may be defined to encompass any multipurpose electronic, computing, and/or telecommunications device (or combination of devices) that is easily transported by a user, is capable of wireless communication (using, for example, WLAN, Wi-Fi, cellular, and/or Bluetooth), and has a camera, where the device's primary purpose is telecommunication, computing, and/or electronic gaming.

In certain embodiments, device 1800 includes camera system 1802. Camera system 1802 may include one or more cameras. Camera system 1802 may include cameras located either front-facing on device 1800 (e.g., facing on same side as a display of the mobile device) and/or back-facing on the device (e.g., facing on an opposite side as the display). In some embodiments, camera system 1802 may include multiple cameras. For example, camera system 1802 may include cameras that provide different fields of view such as telephoto, wide angle, super wide angle, etc. Each camera may have its own set of one or more lenses and an image sensor (e.g., image sensor 410, described above). The multiple cameras or lenses may be operated together or independently. In some embodiments, one camera is used for preview imaging (e.g., previewing the image on a display of device 1800). An example of a multiple camera system is described in U.S. Pat. No. 10,429,608 to Baer et al., which is incorporated by reference as if fully set forth herein.

Figure 19:
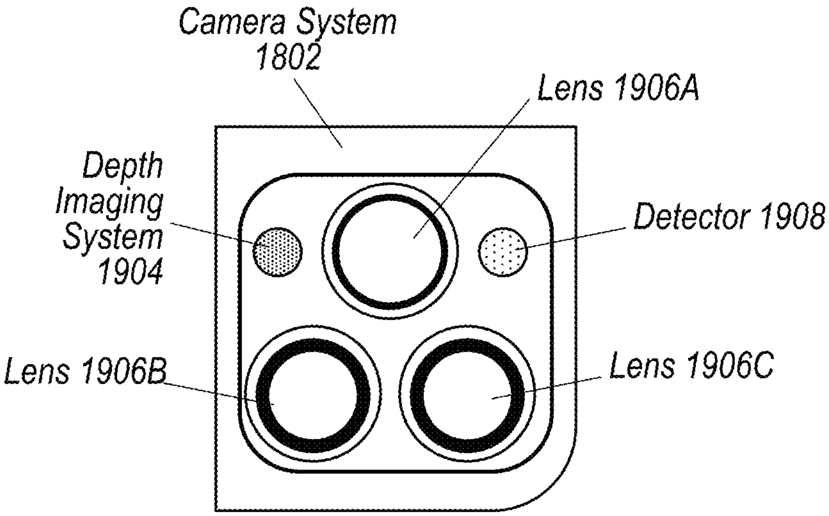
FIG. 19 depicts a representation of an embodiment of a camera system on a mobile device.

FIG. 19 depicts a representation of an embodiment of camera system 1802 on device 1800. In the illustrated embodiment, camera system 1802 includes depth imaging system 1904, lenses 1906, and detector 1908. In various embodiments, depth imaging system 104 implements one or more depth sensing technologies to determine depth at one or more different points in a scene that is being captured by camera system 1902. Examples of depth sensing technologies that may be implemented in depth imaging system 1904 include, but are not limited to, stereoscopic depth, structured pattern illumination, illuminating in a fixed pattern, scanning illumination (e.g., scanning a line across a field-of-view), and direct or indirect time-of-flight. In various embodiments, detector 1908 is a flicker detector. Flicker detectors may provide detection for automatic white balancing (AWB) or autoexposure (AE) determination in camera system 1902.

In the illustrated embodiments, lenses 1906 includes three lenses 1906A, 1906B, 1906C. Embodiments with other numbers of lenses may, however, also be contemplated. In certain embodiments, lenses 1906A, 1906B, 1906C include a telephoto lens, a wide-angle lens, and a super-wide-angle lens. In one contemplated embodiment, lens 1906A is the telephoto lens. In various embodiments, lenses 1906, depth imaging system 1904, and detector 1908 are placed in close proximity to each other such that the components have similar field-of-views in camera system 1902. For example, lenses 1906, depth imaging system 1904, and detector 1908 may be positioned within about 2-3 cm of each other. Placing these components within such small distances also allows camera system 1902 to have a small form factor.

In certain instances, a telephoto lens (e.g., lens 1906A) has various structures that provide optical zoom capabilities while maintaining the small form factor of camera system 1902. The telephoto lens provides optical zoom capabilities to provide higher resolution photos when zooming in on objects (compared to digital zooming that reduces the image resolution). In various embodiments, prism 100 is implemented in the telephoto lens 1906A. Implementing prism 100 in lens 1906A provides improved image quality in the telephoto lens while maintaining the desirable small form factor of camera system 1802.

The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Numerous variations and modifications will become apparent to those skilled in the art once the above disclosure is fully appreciated. It is intended that the following claims be interpreted to embrace all such variations and modifications.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The following clauses describe various examples embodiments consistent with the description provided herein.

Clause 1. An optical device, comprising:

an optical prism, wherein the optical prism includes at least one surface that has an angle of incidence for light in the prism of less than 40°; and a coating placed on the at least one surface of the prism, wherein the coating includes a plurality of alternating layers of at least two refractive materials with different indices of refraction, wherein a subset of the plurality of alternating layers has a variation in thickness between layers above a lower thickness variation threshold, and wherein remaining alternating layers in the plurality have a variation in thickness between layers below the lower thickness variation threshold.

Clause 2. The device of clause 1, wherein the at least one surface is an interior surface of the prism.

Clause 3. The device of clause 1, wherein the alternating layers in the subset have a random pattern of thicknesses from a glass side of the prism towards an air side of the prism.

Clause 4. The device of clause 1, wherein the remaining alternating layers have an ordered pattern of thicknesses from a glass side of the prism towards an air side of the prism.

Clause 5. The device of clause 4, wherein the remaining alternating layers increase in thickness from a glass side of the prism towards an air side of the prism.

Clause 6. The device of clause 1, wherein the variation in thickness between layers in the subset of the plurality of alternating layers is below an upper thickness variation threshold.

Clause 7. The device of clause 1, wherein the lower thickness variation threshold is determined based on the coating having an optical thickness orderliness value (ORR) of at most 0.1.

Clause 8. The device of clause 7, wherein the optical thickness orderliness value (ORR) is defined as:

ORR=1−(SSE/SST) where:

SSE is a fitting error sum of squares defined as:

$$SSE = \sum_{i=1}^{n} (OTHK_i - y_1)^2;$$

and

SST is a total sum of squares defined as:

$$SST = \sum_{i=1}^{n} \left(OTHK_i^2 - \left(\sum_{i=1}^{n} OTHK_i\right)^2 / _n\right);$$

OTHK being an optical thickness of a layer of refractive material in the coating defined as:

OTHK=index(λ)×THK/λ; where index(λ) is an index of refraction of the layer at a wavelength λ, and THK is a physical thickness of the layer;

y being a least squares fitting of OTHK determined according to y=a×OTHK+b; and n is a total number of alternating layers of refractive material in the coating.

Clause 9. The device of clause 8, wherein the coating has the optical thickness orderliness value (ORR) of at most 0.1.

Clause 10. The device of clause 7, wherein the optical thickness orderliness value (ORR) is determined for both the first portion and the second portion of the coating.

Clause 11. An optical device, comprising:

an optical prism, wherein the optical prism includes at least one surface that has an angle of incidence for light in the prism of less than 40°; and a coating placed on the at least one surface, wherein the coating includes alternating layers of at least two refractive materials with different indices of refraction, and wherein the coating has an optical thickness orderliness value (ORR) of at most 0.1, the optical thickness orderliness value (ORR) being defined as:

ORR=1−(SSE/SST) where:

SSE is a fitting error sum of squares defined as:

$$SSE = \sum_{i=1}^{n} (OTHK_i - y_1)^2;$$

and

SST is a total sum of squares defined as:

$$SST = \sum_{i=1}^{n} \left(OTHK_i^2 - \left(\sum_{i=1}^{n} OTHK_i\right)^2 / _n\right);$$

OTHK being an optical thickness of a layer of refractive material in the coating defined as:

OTHK=index(λ)×THK/λ; where index(λ) is an index of refraction of the layer at a wavelength λ, and THK is a physical thickness of the layer;

y being a least squares fitting of OTHK determined according to y=a×OTHK+b; and n is a total number of alternating layers of refractive material in the coating.

Clause 12. The device of clause 11, wherein the at least one surface is an interior surface of the prism.

Clause 13. The device of clause 11, wherein the at least one surface is configured to reflect at least some light inside the prism.

Claude 14. The device of clause 11, wherein the prism includes dielectric material.

Clause 15. The device of clause 11, wherein the at least one surface that has an angle of incidence of 30°.

Clause 16. The device of clause 11, wherein the prism is an oblique prism.

Clause 17. The device of clause 11, wherein the prism is a parallelepiped.

Clause 18. The device of clause 11, wherein the prism has a parallelogram cross-sectional shape with the at least one surface being a first side of the parallelogram.

Clause 19. The device of clause 18, wherein the prism is configured to be positioned for light to enter the prism perpendicular on a second side of the prism, the second side being adjacent to the first side.

Clause 20. The device of clause 18, further comprising an additional coating substantially similar to the coating placed on a surface of a third side of the parallelogram, the third side being opposite the first side.

Clause 21. The device of clause 20, wherein the prism is configured to be positioned for light to enter the prism perpendicular on a second side of the prism and exit the prism on a fourth side of the prism, the second side being adjacent to the first side and the fourth side being opposite the second side.

Clause 22. The device of clause 11, wherein the prism is configured to be positioned to receive light from one or more lenses.

Clause 23. The device of clause 11, wherein the coating has an ORR*THK value of at most 1, wherein the ORR*THK value is determined as:

$$ORR * THK = ORR \times \sum_{i=1}^{n} THK_i.$$

Clause 24. The device of clause 11, wherein the coating is configured to reflect light with a reflectance of at least 90%.

Clause 25. The device of clause 11, wherein the coating is configured to reflect light with a phase retardance of at most 1500 and a group delay of at most 20 femtoseconds.

Clause 26. The device of clause 11, wherein the coating is configured to reflect light with a degradation in modular transfer function (MTF) of at most 5%.

Clause 27. The device of clause 11, wherein the at least two refractive materials with different indices of refraction include silicon dioxide and titanium dioxide.

Clause 28. A camera system, comprising:

an image sensor;

a lens assembly positioned in a field of view of the image sensor;

an optical prism positioned between the image sensor and the lens assembly, wherein the optical prism includes at least one surface that has an angle of incidence for light in the prism of less than 40°; and a coating placed on the at least one surface, wherein the coating includes alternating layers of at least two refractive materials with different indices of refraction, and wherein the coating has an optical thickness orderliness value (ORR) of at most 0.1, the optical thickness orderliness value (ORR) being defined as:

ORR=1−(SSE/SST) where:

SSE is a fitting error sum of squares defined as:

$$SSE = \sum_{i=1}^{n} (OTHK_i - y_1)^2;$$

and

SST is a total sum of squares defined as:

$$SST = \sum_{i=1}^{n} \left(OTHK_i^2 - \left(\sum_{i=1}^{n} OTHK_i\right)^2 / _n\right);$$

OTHK being an optical thickness of a layer of refractive material in the coating defined as:

OTHK=index(λ)×THK/λ; where index(λ) is an index of refraction of the layer at a wavelength λ, and THK is a physical thickness of the layer;

y being a least squares fitting of OTHK determined according to y=a×OTHK+b; and n is a total number of alternating layers of refractive material in the coating.

Clause 29. The camera system of clause 28, wherein the lens assembly is a telephoto lens assembly.

Clause 30. The camera system of clause 28, wherein the lens assembly includes a low-dispersion glass lens.

Clause 31. The camera system of clause 28, wherein the prism is a parallelepiped prism, the at least one surface being on a first side of the parallelepiped, wherein the lens assembly is positioned such that light from the lens assembly enters the prism on a second side of the parallelepiped, the second side being adjacent the first side.

Clause 32. The camera system of clause 31, further comprising an additional coating substantially similar to the coating placed on a surface of a third side of the parallelepiped, the third side being opposite the first side, wherein the light exits the lens assembly on a fourth side of the parallelepiped, the fourth side being opposite the second side.

Clause 33. The camera system of clause 32, wherein the lens assembly and the prism are configured such that light enters the prism on the second side of the parallelepiped, reflects off the coating on the first side, reflects off the second side, reflects off the fourth side, reflects off the additional coating on the third side, and then exits on the fourth side of the parallelepiped directed towards the image sensor.

Clause34. The camera system of clause 28, wherein the prism is configured such that light exiting the prism is spatially displaced from light entering the prism.

Clause 35. An optical device, comprising:

an optical prism having a parallelepiped shape, the prism being configured to receive light into the prism on a first side of the parallelepiped shape and transmit light out of the prism on a third side of the parallelepiped shape, the third side being parallel the first side, wherein internal surfaces on a second side and a fourth side of the parallelepiped shape have angles of incidence for the light in the prism of at most 40°, the second side being adjacent to the first side and parallel the fourth side; and a coating placed on the internal surfaces, wherein the coating includes alternating layers of at least two refractive materials with different indices of refraction, and wherein the coatings have optical thickness orderliness values (ORRs) of at most 0.1, the optical thickness orderliness value (ORR) being defined as:

ORR=1−(SSE/SST) where:

SSE is a fitting error sum of squares defined as:

$$SSE = \sum_{i=1}^{n} (OTHK_i - y_1)^2;$$

and

SST is a total sum of squares defined as:

$$SST = \sum_{i=1}^{n} \left(OTHK_i^2 - \left(\sum_{i=1}^{n} OTHK_i\right)^2 / n\right);$$

OTHK being an optical thickness of a layer of refractive material in the coating defined as:

OTHK=index(λ)×THK/λ; where index(λ) is an index of refraction of the layer at a wavelength λ, and THK is a physical thickness of the layer;

y being a least squares fitting of OTHK determined according to y=a×OTHK+b; and n is a total number of alternating layers of refractive material in the coating.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An optical device, comprising:

an optical prism, wherein the optical prism includes at least one surface that has an angle of incidence for light in the prism of less than 40°; and a coating placed on the at least one surface of the prism, wherein the coating includes a plurality of alternating layers of at least two refractive materials with different indices of refraction, wherein a subset of the plurality of alternating layers has a variation in thickness between layers above a lower thickness variation threshold, wherein remaining alternating layers in the plurality have a variation in thickness between layers below the lower thickness variation threshold, wherein the remaining alternating layers have an ordered pattern of thicknesses from a glass side of the prism towards an air side of the prism, and wherein the alternating layers in the subset do not have the ordered pattern of thicknesses from the glass side of the prism towards the air side of the prism.

2. The device of claim 1, wherein the at least one surface is an interior surface of the prism.

3. The device of claim 1, wherein the alternating layers in the subset have a random pattern of thicknesses from the glass side of the prism towards the air side of the prism.

4. The device of claim 1, wherein the remaining alternating layers increase in thickness from the glass side of the prism towards the air side of the prism.

5. The device of claim 1, wherein the variation in thickness between layers in the subset of the plurality of alternating layers is below an upper thickness variation threshold.

6. The device of claim 1, wherein the lower thickness variation threshold is determined based on the coating having an optical thickness orderliness value (ORR) of at most 0.1.

7. The device of claim 6, wherein the optical thickness orderliness value (ORR) is defined as:

ORR=1−(SSE/SST) where:

SSE is a fitting error sum of squares defined as:

$$SSE = \sum_{i=1}^{n} (OTHK_i - y_1)^2;$$

and

SST is a total sum of squares defined as:

$$SST = \sum_{i=1}^{n} \left(OTHK_i^2 - \left(\sum_{i=1}^{n} OTHK_i\right)^2 / n\right);$$

OTHK being an optical thickness of a layer of refractive material in the coating defined as:

OTHK=index(λ)×THK/λ; where index(λ) is an index of refraction of the layer at a wavelength λ, and THK is a physical thickness of the layer;

y being a least squares fitting of OTHK determined according to y=a×OTHK+b; and n is a total number of alternating layers of refractive material in the coating.

8. The device of claim 6, wherein the optical thickness orderliness value (ORR) is determined for both the subset of the plurality of alternating layers and the remaining alternating layers in the plurality of alternating layers of the coating.

9. An optical device, comprising:

an optical prism, wherein the optical prism includes at least one surface that has an angle of incidence for light in the prism of less than 40°; and a coating placed on the at least one surface, wherein the coating includes alternating layers of at least two refractive materials with different indices of refraction, and wherein the coating has an optical thickness orderliness value (ORR) of at most 0.1, the optical thickness orderliness value (ORR) being defined as:

ORR=1−(SSE/SST) where:

SSE is a fitting error sum of squares defined as:

$$SSE = \sum_{i=1}^{n} (OTHK_i - y_1)^2;$$

and

SST is a total sum of squares defined as:

$$SST = \sum_{i=1}^{n} \left(OTHK_i^2 - \left(\sum_{i=1}^{n} OTHK_i\right)^2 / n\right);$$

OTHK being an optical thickness of a layer of refractive material in the coating defined as:

OTHK=index(λ)×THK/λ; where index(λ) is an index of refraction of the layer at a wavelength λ, and THK is a physical thickness of the layer;

y being a least squares fitting of OTHK determined according to y=a×OTHK+b; and n is a total number of alternating layers of refractive material in the coating.

10. The device of claim 9, wherein the prism includes dielectric material.

11. The device of claim 9, wherein the at least one surface that has an angle of incidence of 30°.

12. The device of claim 9, wherein the prism has a parallelogram cross-sectional shape with the at least one surface being a first side of the parallelogram.

13. The device of claim 12, wherein the prism is configured to be positioned for light to enter the prism perpendicular on a second side of the prism, the second side being adjacent to the first side.

14. The device of claim 12, further comprising an additional coating substantially similar to the coating placed on a surface of a third side of the parallelogram, the third side being opposite the first side.

15. The device of claim 9, wherein the coating has an ORR*THK value of at most 1, wherein the ORR*THK value is determined as:

$$ORR * THK = ORR \times \sum_{i=1}^{n} THK_i.$$

16. The device of claim 9, wherein the coating is configured to reflect light with a reflectance of at least 90%.

17. The device of claim 9, wherein the coating is configured to reflect light with a degradation in modular transfer function (MTF) of at most 5%.

18. The device of claim 9, wherein the at least two refractive materials with different indices of refraction include silicon dioxide and titanium dioxide.

19. An optical device, comprising:

an optical prism having a parallelepiped shape, the prism being configured to receive light into the prism on a first side of the parallelepiped shape and transmit light out of the prism on a third side of the parallelepiped shape, the third side being parallel the first side, wherein internal surfaces on a second side and a fourth side of the parallelepiped shape have angles of incidence for the light in the prism of at most 40°, the second side being adjacent to the first side and parallel the fourth side; and a coating placed on the internal surfaces, wherein the coating includes alternating layers of at least two refractive materials with different indices of refraction, and wherein the coatings have optical thickness orderliness values (ORRs) of at most 0.1, the optical thickness orderliness value (ORR) being defined as:

ORR=1−(SSE/SST) where:

SSE is a fitting error sum of squares defined as:

$$SSE = \sum_{i=1}^{n} (OTHK_i - y_1)^2;$$

and

SST is a total sum of squares defined as:

$$SST = \sum_{i=1}^{n} \left(OTHK_i^2 - \left(\sum_{i=1}^{n} OTHK_i\right)^2 / n\right);$$

OTHK being an optical thickness of a layer of refractive material in the coating defined as:

OTHK=index(λ)×THK/λ; where index(λ) is an index of refraction of the layer at a wavelength λ, and THK is a physical thickness of the layer;

y being a least squares fitting of OTHK determined according to y=a×OTHK+b; and n is a total number of alternating layers of refractive material in the coating.

20. The device of claim 19, wherein the prism includes dielectric material.

* * * * *